US012787079B2

(12) United States Patent
Venkatraman et al.

(10) Patent No.: US 12,787,079 B2
(45) Date of Patent: Nov. 3, 2026

(54) ACCESS TUNNEL REDUNDANCY FOR WIRELESS CLIENT DEVICES ACROSS FABRIC EDGES

(71) Applicant: Cisco Technology, Inc., San Jose, CA (US)

(72) Inventors: Rajagopal Venkatraman, San Jose, CA (US); Roberto Mitsuo Kobo, Pleasanton, CA (US); Vinod Chandran, Newark, CA (US); Sujith Viswanath, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 18/589,206

(22) Filed: Feb. 27, 2024

(65) Prior Publication Data

US 2025/0274993 A1 Aug. 28, 2025

(51) Int. Cl.
*H04W 76/12* (2018.01)
*H04L 61/5007* (2022.01)
*H04W 8/26* (2009.01)

(52) U.S. Cl.
CPC ......... *H04W 76/12* (2018.02); *H04L 61/5007* (2022.05); *H04W 8/26* (2013.01)

(58) Field of Classification Search
CPC .... H04W 76/12; H04W 8/26; H04L 61/5007; H04L 41/0654; H04L 41/0663; H04L 45/247; H04L 45/28; H04L 12/4633
See application file for complete search history.

(56) References Cited

U.S. PATENT DOCUMENTS

2011/0274037 A1* 11/2011 Jain ........................ H04W 8/085 370/328
2012/0110393 A1* 5/2012 Shieh ...................... H04L 69/40 714/48
2014/0359740 A1* 12/2014 Yoon ....................... H04W 8/02 726/7
2016/0134517 A1 5/2016 Shukla et al.
2018/0034725 A1 2/2018 Gundavelli et al.
2019/0182202 A1 6/2019 Garcia Del Rio et al.
2019/0319871 A1* 10/2019 Indiresan ................ H04L 45/04
2019/0327113 A1* 10/2019 Kandasamy ........ H04L 61/5014
2020/0021523 A1* 1/2020 Wang .................. H04L 12/4633
2020/0036577 A1* 1/2020 Bhagvath ................ H04L 45/28
2022/0286350 A1 9/2022 Prabhakar et al.
2023/0131054 A1 4/2023 Boutros et al.

* cited by examiner

*Primary Examiner* — Kan Yuen
(74) *Attorney, Agent, or Firm* — Polsinelli P.C.

(57) ABSTRACT

In an overlay access network, a first access tunnel between a first fabric edge node and a wireless access point (AP) can be configured as active, based on the first fabric edge node being active. A second access tunnel between a second fabric edge node and the wireless AP can be configured as standby based on the second fabric edge node being standby, with the same virtual IP address attached to the first and second access tunnels. Based on an active failure, a switch to standby for the first fabric edge node and to active for the second fabric edge node is signaled to an Extended Node (EN). The EN steers traffic on the first access tunnel with the virtual IP address to the second fabric edge node, based on the switch and using a portion of the second access tunnel between the EN and the second fabric edge node.

20 Claims, 8 Drawing Sheets

ACCESS TUNNEL REDUNDANCY FOR WIRELESS CLIENT DEVICES ACROSS FABRIC EDGES

TECHNICAL FIELD

The present technology generally relates to the field of computer networking, and more particularly, to systems and techniques for network redundancy for access tunnels between wireless client devices and fabric edge nodes of an overlay network.

BACKGROUND

A software-defined access (SDA) network utilizes software to automate and simplify network management. An SDA network provides a single, unified fabric for wired and wireless networks, and can implement policy-based automation while offering robust network scalability. For example, software defined networking (SD-WAN) was developed to provide various advantages over traditional Wide Area Networks (WANs). SD-WANs may provide methods for prioritizing critical network traffic and take advantage of Internet broadband connections to connect directly to multi-cloud resources. Further, SD-WANs may simplify the management of WAN fabrics with controller-first overlays that are independent of transport layers (e.g., MPLS, Ethernet, Internet, Long-Term Evolution (LTE) networks, 5G networks, etc.). SD-WAN controllers may be configured to choose among the available transport mediums to deliver optimal application performance as defined through service level agreements (SLAs).

In an SDA network, extended nodes (ENs) and policy extended nodes (PENs) can be used to extend the capabilities of the network. ENs can be provided as non-fabric devices that have been integrated into the SDA fabric, and may allow devices that are not directly compatible with the SDA fabric to connect to and participate in the network. For example, ENs can be connected to a fabric edge node, and can enable third-party devices (e.g., client devices, etc.) and legacy switches to connect to the EN and thereby participate in the SDA network. In general, ENs can be used to provide network connectivity to devices that are not natively SDA-capable, to facilitate network services to connected devices, and to implement policy, security, and/or access control features by relying on other connected fabric edge nodes. A PEN is a form of EN that is capable of enforcing policy decisions made by the SDA fabric. By contrast, ENs depend on fabric edge nodes for policy enforcement. In some examples, PENs can be deployed to extend the policy enforcement capabilities of the SDA fabric into parts of the network that are not directly included in the fabric (e.g., such as remote branches or locations, etc.).

BRIEF DESCRIPTION OF THE DRAWINGS

In order to describe the manner in which the features of the disclosure can be obtained, a more particular description of the present technology will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
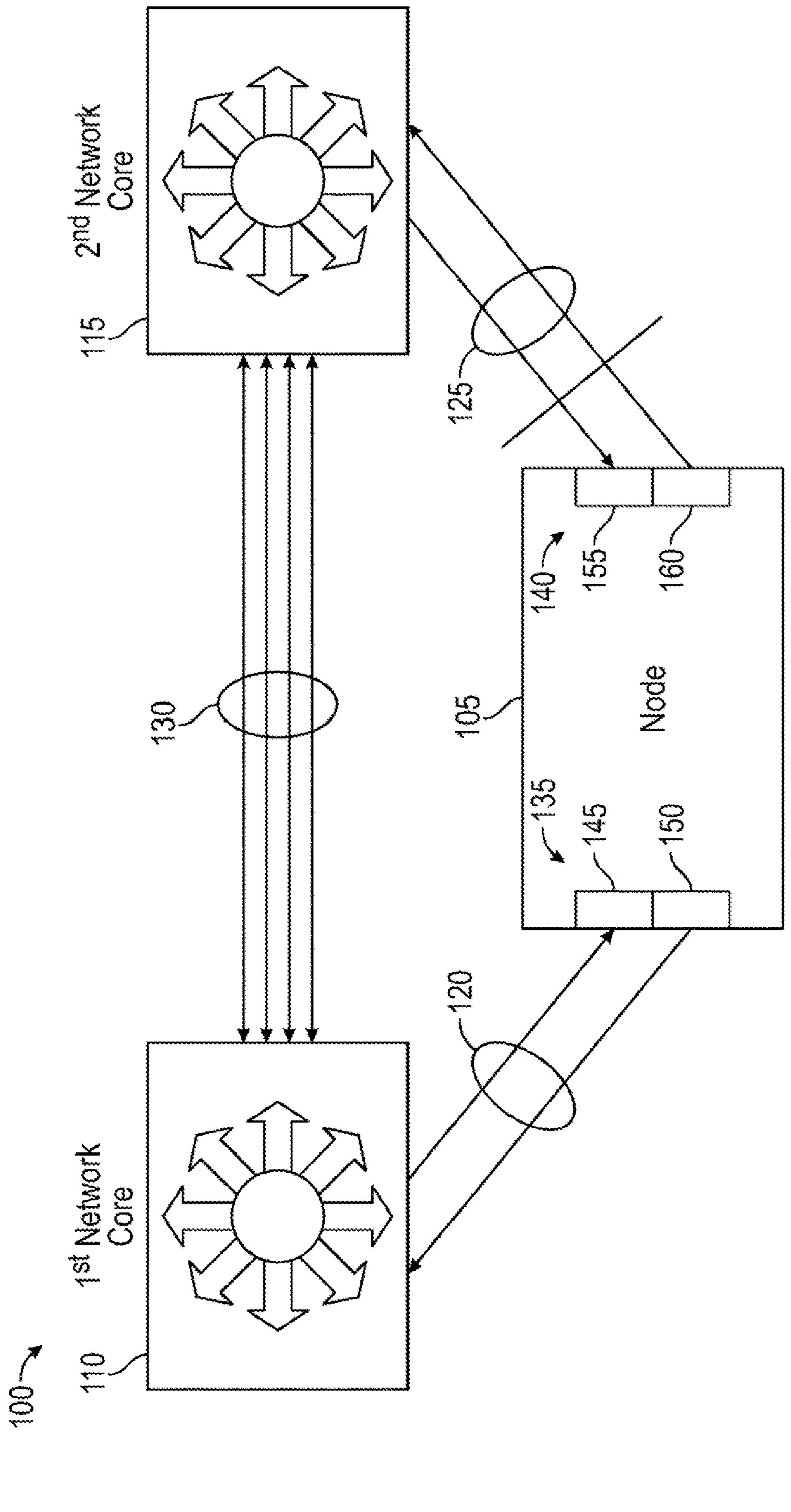
FIG. 1 is a block diagram illustrating an example operating environment of a fast active-standby link redundancy mechanism, in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed are systems, apparatuses, methods, and computer-readable media for access tunnel redundancy for wireless client devices across fabric edges of an overlay network, in accordance with some embodiments. In one illustrative example, a method is provided, the method comprising: provisioning a first access tunnel between a first fabric edge node and a wireless access point (AP) of an overlay access network, wherein the first access tunnel is configured as active based on an active role configured for the first fabric edge node; provisioning a second access tunnel between a second fabric edge node and the wireless AP, wherein the second access tunnel is configured as standby based on a standby role configured for the second fabric edge node; transmitting, to the wireless AP, a virtual IP address attached to the first access tunnel and the second access tunnel, wherein the virtual IP address attached to the first access tunnel and the second access tunnel is the same; detecting an active link or node failure associated with one or more of the first access tunnel or the first fabric edge node; configuring an Extended Node (EN) of the overlay access network with information indicative of a switch to a standby role for the first fabric edge node and a switch to an active role for the second fabric edge node; and using the EN to steer traffic on the first access tunnel and having the virtual IP address to the second fabric edge node, based on the switch to the active role for the second fabric edge node and using at least a portion of the second access tunnel between the EN and the second fabric edge node.

In some aspects, prior to detecting the active link or node failure, the EN is configured with information indicative of the active role for the first fabric edge node and the standby role for the second fabric edge node; and the EN steers traffic from the wireless AP on the first access tunnel and having the virtual IP address to the first fabric edge node, based on the active role configured for the first fabric edge node and without using the second access tunnel.

In some aspects, the virtual IP address is attached to a first tunnel endpoint (TEP) associated with the first fabric edge node and a second TEP associated with the second fabric edge node, and wherein wireless clients associated with the wireless AP are configured to use the virtual IP address to communicate with a fabric edge without using the first TEP or the second TEP.

In some aspects, the EN is configured with information indicative of a switch to a standby role for the first access tunnel provisioned for the first fabric edge node and a switch to an active role for the second access tunnel provisioned for the second fabric edge node.

In some aspects, the EN is configured to transmit a notification indicative of a topology change to the first fabric edge node and the second fabric edge node, wherein the notification indicative of the topology change includes the information indicative of the switch.

In some aspects, the second fabric edge node transmits a notification to a control plane associated with the overlay access network and an overlay core network including the first and second fabric edge nodes, wherein the notification to the control plane signals the switch from the standby role to the active role for the second fabric edge node.

In some aspects, the first fabric edge node is configured to switch from the active role to the standby role based on receiving the notification indicative of the topology change from the EN, and wherein the second fabric edge node is configured to switch from the standby role to the active role based on receiving the notification indicative of the topology change from the EN.

In some aspects, the EN includes a fast active-standby link redundancy mechanism to reconfigure one or more of the first fabric edge node or the first access tunnel with the standby role based on detecting the active link or node failure, and to reconfigure one or more of the second fabric edge node or the second access tunnel with the active role based on detecting the active link or node failure.

In some aspects, detecting the active link or node failure is based on signaling between the EN and one or more of the first fabric edge node or the second fabric edge node.

In some aspects, the first access tunnel is provisioned based on an active role or a standby role configured for the first fabric edge node by the EN, and wherein the second access tunnel is provisioned based on a standby role or an active role configured for the second fabric edge node by the EN.

In some aspects, the first fabric edge node and the second fabric edge node are included in an overlay core network associated with the overlay access network.

In some aspects, the EN is included along a path of the first access tunnel between the first fabric edge node and the wireless AP; and the EN is included along a path of the second access tunnel between the second fabric edge node and the wireless AP.

In some aspects, the EN is configured to steer traffic from wireless clients of the wireless AP to the first fabric edge node or the second fabric edge node using a selected one of the first access tunnel or the second access tunnel, based on the EN being included along the path of the first access tunnel and being included along the path of the second access tunnel.

In some aspects, the EN comprises a Policy Extended Node (PEN).

In another illustrative example, a system is provided, the system comprising: one or more processors; and one or more computer-readable storage media having computer-readable instructions stored thereon, wherein the computer-readable instructions, when executed by the one or more processors, cause the one or more processors to: provision a first access tunnel between a first fabric edge node and a wireless access point (AP) of an overlay access network, wherein the first access tunnel is configured as active based on an active role configured for the first fabric edge node; provision a second access tunnel between a second fabric edge node and the wireless AP, wherein the second access tunnel is configured as standby based on a standby role configured for the second fabric edge node; transmit, to the wireless AP, a virtual IP address attached to the first access tunnel and the second access tunnel, wherein the virtual IP address attached to the first access tunnel and the second access tunnel is the same; detect an active link or node failure associated with one or more of the first access tunnel or the first fabric edge node; configure an Extended Node (EN) of the overlay access network with information indicative of a switch to a standby role for the first fabric edge node and a switch to an active role for the second fabric edge node; and use the EN to steer traffic on the first access tunnel and having the virtual IP address to the second fabric edge node, based on the switch to the active role for the second fabric edge node and using at least a portion of the second access tunnel between the EN and the second fabric edge node.

In another illustrative example, one or more non-transitory computer-readable media are provided comprising computer-readable instructions, which when executed by one or more processors, cause the one or more processors to: provision a first access tunnel between a first fabric edge node and a wireless access point (AP) of an overlay access network, wherein the first access tunnel is configured as active based on an active role configured for the first fabric edge node; provision a second access tunnel between a second fabric edge node and the wireless AP, wherein the second access tunnel is configured as standby based on a standby role configured for the second fabric edge node; transmit, to the wireless AP, a virtual IP address attached to the first access tunnel and the second access tunnel, wherein the virtual IP address attached to the first access tunnel and the second access tunnel is the same; detect an active link or node failure associated with one or more of the first access tunnel or the first fabric edge node; configure an Extended Node (EN) of the overlay access network with information indicative of a switch to a standby role for the first fabric edge node and a switch to an active role for the second fabric edge node; and use the EN to steer traffic on the first access tunnel and having the virtual IP address to the second fabric edge node, based on the switch to the active role for the second fabric edge node and using at least a portion of the second access tunnel between the EN and the second fabric edge node.

EXAMPLE EMBODIMENTS

The present technology addresses the need in the art for providing seamless and rapidly converging link and/or access tunnel redundancy for wireless clients associated with access points (APs) connected behind dual-homed Extended Nodes (ENs) and/or Policy Extended Nodes (PENs) of a fabric overlay network. In many existing software-defined access (SDA) networks and/or various other fabric overlay networks, the ENs and PENs may be provided as singly homed devices. Some enterprise use cases (e.g., airport deployments, etc.) may be associated with stricter service requirements that expect no traffic disruption due to link or node (fabric edge) failure(s). Existing solutions, such as Cisco Flexlink+, may be seen to provide sub-second convergence during link and node failures in the EN and/or PEN connecting to two or more fabric edge nodes of an SDA or other fabric overlay network. However, such solutions and approaches may be designed for providing link and/or access tunnel redundancy for wired hosts connected behind EN and/or PEN nodes, but are not configured to provide link and/or access tunnel redundancy for wireless clients when wireless APs (rather than, or in addition to, wired hosts) are connected in the EN and PEN nodes.

As noted previously, a software-defined access (SDA) network utilizes software to automate and simplify network management. An SDA network provides a single, unified fabric for wired and wireless networks, and can implement policy-based automation while offering robust network scalability. In an SDA network, extended nodes (ENs) and policy extended nodes (PENs) can be used to extend the capabilities of the network.

For example, ENs can be provided as non-fabric devices that have been integrated into the SDA fabric, and may allow devices that are not directly compatible with the SDA fabric to connect to and participate in the network. For example, ENs can be connected to a fabric edge node, and can enable third-party devices (e.g., client devices, etc.) and legacy switches to connect to the EN and thereby participate in the SDA network. In general, ENs can be used to provide network connectivity to devices that are not natively SDA-capable; to facilitate network services to connected devices; and to implement policy, security, and/or access control features by relying on other connected fabric edge nodes.

A PEN is a form of EN that is capable of enforcing policy decisions made by the SDA fabric. By contrast, ENs depend on fabric edge nodes for policy enforcement. In some examples, PENs can be deployed to extend the policy enforcement capabilities of the SDA fabric into parts of the network that are not directly included in the fabric (e.g., such as remote branches or locations, etc.).

Existing solutions for link redundancy can be used in the EN and PEN connecting to two fabric edge nodes to mitigate traffic disruptions due to link or node (fabric edge) failures. Such solutions can provide sub-second converge during link and node failures, but are limited to use only with wired hosts connected behind an EN or PEN nodes. There is a need for solutions that can be used to mitigate traffic disruptions due to link or node failures for wireless clients when access points (APs) are connected in the EN and PEN nodes of the SDA network.

In some existing approaches, a form of "access redundancy" may be provided based on various protocols, such as Virtual Router Redundancy Protocol (VRRP), Hot Standby Router Protocol (HSRP), etc., among various others. For example, VRRP can be used to configure multiple routers to work together in a group, and thereby present the appearance of a single virtual router on the network. The routers in a VRRP group elect one router as a primary, with the remaining routers of the VRRP group assigned standby roles. The primary router is used to handle all traffic for the IP address of the single virtual router configured for the VRRP group. If the primary router fails, one of the standby routers assumes the primary role, providing fallback and redundancy for a quicker failover transition for end users. Similarly, HSRP also allows routers to work in concert to present a single virtual router to the network. HSRP-based approaches creates a Hot Standby group of routers, with one router actively routing packets as the active (e.g., primary) router and a different router (of the same group) configured as a standby router ready to take over if the active router fails.

In some aspects, although both VRRP-based approaches and HSRP-based approaches may provide a Virtual IP address for a group of routers, such that the access devices see the same "gateway," both the VRRP-based approaches and the HSRP-based approaches can be seen to lack a mechanism for creating the same tunnel in both virtual devices. Accordingly, there is a need for systems and techniques that can be used to provide improved link and access tunnel redundancy across fabric edges of an SDA or other overlay network.

Other existing techniques may be seen to provide various forms of "dual or multi-homing" capabilities, such that the same device or network can connect to multiple edge nodes. For example, such techniques may include SDA Anycast Gateway and/or Ethernet Virtual Private Network (EVPN) multi-homing. However, similar to VRRP and HSRP-based approaches, SDA Anycast Gateway and EVPN multi-homing do not provide a solution for handling tunnels connecting to the access and/or edge devices, and improvements are needed.

In general, access tunnels are used for various purposes in computer networking. The use of access tunnels can correspond to using various types, forms, implementations, etc., of overlay/tunnel technology on the access layer of a network. For instance, in Virtual Extensible Local Access Networks (VxLAN) and/or EVPN implementations, VxLAN tunnels may be used to connect access points (APs) to VxLAN Tunnel Endpoints (VTEPs); in Hierarchical Virtual Private LAN Service (H-VPLS) architectures, a VPLS tunnel may be used from the access devices to the Provider Edge (PE) devices; etc. However, the approaches above do not provide seamless redundancy for point-to-point access tunnels, and improvements are needed.

Systems, apparatuses, processes (also referred to as methods), and computer-readable media (collectively referred to as "systems and techniques") are described herein that can address these shortcomings and more, based on implementing access tunnel redundancy for wireless client devices (e.g., connected to wireless APs) across fabric edges of an SDA or other fabric overlay network. For example, the systems and techniques can be used to provide dual-homing capabilities for wireless clients connected to APs in an SDA network, when the APs are connected behind PEN and EN nodes that are themselves dual-homed using a fast active-standby link redundancy mechanism. Dual-homing refers to the capability of a networked device to simultaneously connect to multiple APs or networks, and allows the device to utilize multiple connections for various purposes.

For example, the systems and techniques described herein can be configured to provide dual homing capabilities for wireless APs (and the wireless clients thereof) based on utilizing a fast active-standby link redundancy mechanism associated with and/or running on an EN or PEN associated with the wireless APs. The fast active-standby link redundancy mechanism can be used to provide access tunnel redundancy for one or more point-to-point access tunnels across fabric edges, in a seamless and efficient manner. For example, access tunnels can be provisioned to at least a first and second fabric edge node, where the two fabric edge nodes match the EN and PEN nodes Active and Standby roles as seen by the EN and PEN. A virtual IP address (e.g., Anycast IP and/or MAC address) can be configured and provided to an AP for the access tunnel end points (TEPs). Based on the use of a single virtual IP address for both TEPs (e.g., a first TEP associated with a first access tunnel to the first fabric edge node, and a second TEP associated with a second access tunnel to the second fabric edge node), the AP can continue to send traffic across the overlay access network and to the overlay core network where the fabric edge nodes reside. Moreover, the AP can use the virtual IP address for the access tunnel endpoints such that the AP can continue to send traffic during link and/or node failure of the Active fabric edge. A signaling technique can be implemented to control the fabric edge devices to communicate their respective states or roles, such that a consensus is established as to which fabric edge node (e.g., the first fabric edge node associated with the first access tunnel and first TEP, or the second fabric edge node associated with the second access tunnel and second TEP) is the Active fabric edge node and which is the Standby fabric edge node. Moreover, the signaling mechanism can be used for the fabric edge nodes to communicate or otherwise indicate when to switch roles between Active and Standby (e.g., when to switch roles upon link or node failure for one of the access tunnels, etc.).

Further aspects of the systems and techniques will be described with reference to the figures.

FIG. 1 is a block diagram illustrating an example operating environment of a fast active-standby link redundancy mechanism 100, in accordance with some aspects of the present technology. Computer networks have become complex in order to address complicated topologies and a variety of use cases. In some cases, a fast active-standby link redundancy mechanism can be used to provide a simple "per-Virtual Local Area Network (VLAN) active-active link", fast convergence solution that may be extended across multiple nodes and may be deployed in a multi-vendor environment. A fast active-standby link redundancy mechanism can be safely deployed in cases where a Layer 2 (L2) domain extends beyond a node having the per-VLAN active-active link (or active-backup links).

Active-standby link redundancy can be used to provide active-backup internet connectivity or connectivity to a server via two separate Network Interface Cards (NICs), among various other uses. For example, a logical representation may be provided whereby a device connects to a node that provides an "active uplink port" and a "backup uplink port". Examples of the aforementioned connectivity may exist for both Layer 3 (L3) and L2. For example, for L3 interfaces, routers may have backup interface features that were used in a dialup link to back up a serial Wide Area Network (WAN) interface. For L2 interfaces, an available similar feature may be referred to as flexible links (or switchport backup), where an Ethernet switchport may be configured as a primary link and a secondary link may be designated to act as a backup in the event of a failure of the primary link.

Networks have evolved to handle multi-path topologies, providing an "active-active" model. Examples may include "equal cost multi-path" or "equal cost routing" for L3, ether-channel bundling, and technologies such as Provider Backbone Bridging (PBB), Ethernet Virtual Private Network (EVPN), etc., which may provide L2 multi-pathing capabilities natively. Additionally, virtual L2 networks (e.g., VxLAN over IP) may provide multipathing via virtualized L2 tunnels. For L2-level connections, flexible links may provide features desired for this type of connection such as active-standby redundancy, per-VLAN load balancing to provide "per-VLAN active-active", fast convergence, pre-emption, and fast multicast convergence. Additionally, certain technologies have similar "per technology constructs" (e.g., for Multi-Protocol Label Switching (MPLS), backup cross connect types of features may be implemented by different vendors).

While these implementations may be designed as a single-hop, point-to-point solution, it may be difficult to combine multiples of such constructs without a fast active-standby link redundancy mechanism, such as the fast active-standby link redundancy mechanism illustrated in FIG. 1. In some examples, the fast active-standby link redundancy mechanism of FIG. 1 can interact with existing L2 protocols (e.g., spanning tree) and therefore may avoid or reduce configuration errors causing network loops, can function in cases where the link does not go down (e.g., connection via repeater), can notify a change in topology regardless of if the network is terminated at a peer device or not (e.g., similar to L2 networks Topology Change Notifications (TCN)), and may be implemented for either or both a single device as well as a network of devices or devices daisy chained to provide access to multiple devices. For example, the fast active-standby link redundancy mechanism of FIG. 1 can be used to provide flexible, multi-vendor per-VLAN active-active link redundancy that may be simple yet feature-full. This may be accomplished by splitting network ports into inside and outside facing interfaces and by collapsing an open ring or segment protocol to a single network device.

In some aspects, the fast active-standby link redundancy mechanism operating environment 100 shown in FIG. 1 can be used for providing network link redundancy. As shown in FIG. 1, operating environment 100 may comprise a node 105, a first network core 110, and a second network core 115. A first link 120 may connect node 105 and first network core 110. Similarly, a second link 125 may connect node 105 and second network core 115. A third link 130 may comprise a plurality of segments and may connect first network core 110 and second network core 115.

Node 105 may comprise, but is not limited to, an access network node or a Local Area Network (LAN) switch node. Furthermore, node 105 may comprise a plurality of ports that may include a first port 135 and a second port 140. First port 135 may comprise a first port inside facing portion 145 that uses a first protocol and a first port outside facing portion 150 that uses a second protocol. Similarly, second port 140 may comprise a second port inside facing portion 155 that uses the first protocol and a second port outside facing portion 160 that uses the second protocol. Node 105 may operate using the first protocol. First port inside facing portion 145 and second port inside facing portion 155 may comprise termination points for the second protocol. Similarly, first port outside facing portion 150 and second port outside facing portion 160 may comprise termination points for the first protocol. The first protocol may comprise, but is not limited to, Resilient Ethernet Protocol (REP). The second protocol may comprise, but is not limited to, Multiple Spanning Tree (MST).

Together, first network core 110 and second network core 115 may represent portions of a network (e.g., the Internet) that node 105 may connect to. First link 120 may comprise an active (e.g., primary) link to the network and second link 125 may comprise a backup (e.g., secondary) link to the network. In other examples, node 105 may connect to a server and first link 120 may comprise an active (e.g., primary) link to the server and second link 125 may comprise a backup (e.g., secondary) link to the server, etc.

In some examples, the fast active-standby link redundancy mechanism 100 of FIG. 1 can be used to provide network link redundancy and may be implemented using node 105 as described in more detail above. Node 105 may provide a virtualization of a network topology comprising a plurality of devices. For example, the network topology may comprise a plurality of devices arranged in an open ring network topology or a segment network topology. Node 105 may virtualize the functionality of the plurality of devices. In other words, the functionality of the plurality of devices may be collapsed into and performed by one device (e.g., node 105), which may eliminate the need to have this functionality carried out by the plurality of devices.

After node 105 provides the virtualization of the network topology comprising the plurality of devices, node 105 may provide at least two ports. Each of the at least two ports may receptively be logically partitioned and may comprise an inside facing portion (e.g., first port inside facing portion 145 and second port inside facing portion 155) that may use a first protocol, and an outside facing portion (e.g., first port outside facing portion 150 and second port outside facing portion 160) that may use a second protocol.

Node 105 may operate internally using the first protocol. For example, logical partitioning of network ports into two portions, one to the "inside network" and one to the "outside network" may simplify the problem of interworking. In conventional systems, the protocol uses a network port that has the attributes to connect to the next hop. With the fast active-standby link redundancy mechanism 100 of FIG. 1, however, one network port may be divided in two portions, one inward, which may be the termination point for the protocol used outside node 105 and the other part may comprise the outward facing port that uses the protocol that is used internally to node 105.

Virtualizing the network topology in node 105 and providing logically partitioned ports to node 105 may provide a simple per-VLAN active-active construct with additional benefits that were not possible with conventional systems, comprising, but not limited to, interoperability to Institute of Electrical and Electronics Engineers (IEEE) L2 network extensions, multi-vendor support, and the ability to extend the number of access ports, for example. In addition, the logical partition of the port may allow for easier integration providing similar functionality provided by certain interworking functions.

Using REP as an example for the first protocol, an open ring network topology may be virtualized and collapsed into a single node. The first protocol may be terminated on the inward facing portion of the network port. In this example, the inward facing portion of the network port may comprise a REP protocol edge port. Consequently, the first protocol may run and may perform all actions inside node 105. However, externally, a connecting device may see the outward facing portion of the network port, which is not a REP port, but instead may be MST (e.g., an IEEE standard protocol).

Accordingly, in this example, the fast active-standby link redundancy mechanism 100 of FIG. 1 may reduce the open ring to a single node, may virtualize the protocol end point to an inward facing portion of the network port, and may keep the outward facing portion of the network port always forwarding. In this way, the fast active-standby link redundancy mechanism 100 may provide a per-VLAN active-active redundancy process with the advantages described above. Moreover, this process may be expanded to include various different internal protocols, L2 or L3, and different external interface/protocol types, etc.

Once node 105 provides at least two ports, node 105 may subsequently control a behavioral mode of the at least two ports. For example, at any point in time, only one interface (e.g., first port 135 or second port 140) may be in a linkup state and actively forwarding traffic. If the primary link (e.g., first link 120) shuts down, the standby link (e.g., second link 125) may take up the duty and starts forwarding traffic and may become the primary link. When the failing link comes back up active, it may go into standby mode and may not participate in traffic forwarding and may become the backup link. This behavior may be changed with pre-emption mode, which may make the failed link the primary link when it becomes available again.

After node 105 controls the behavioral mode of the at least two ports, the node 105 may subsequently communicate, to at least one other node outside the node, the behavioral mode of the at least two ports. For example, node 105 may let nodes on the network outside node 105 know which port (e.g., first port 135 or second port 140) is currently being used as the primary link and which port is being used for the standby link. Once node 105 communicates, to at the least one other node outside the node, the behavioral mode of the at least two ports, the link redundancy process can end (e.g., link redundancy and associated configuration have been provided for the network and the node 105).

Figure 2:
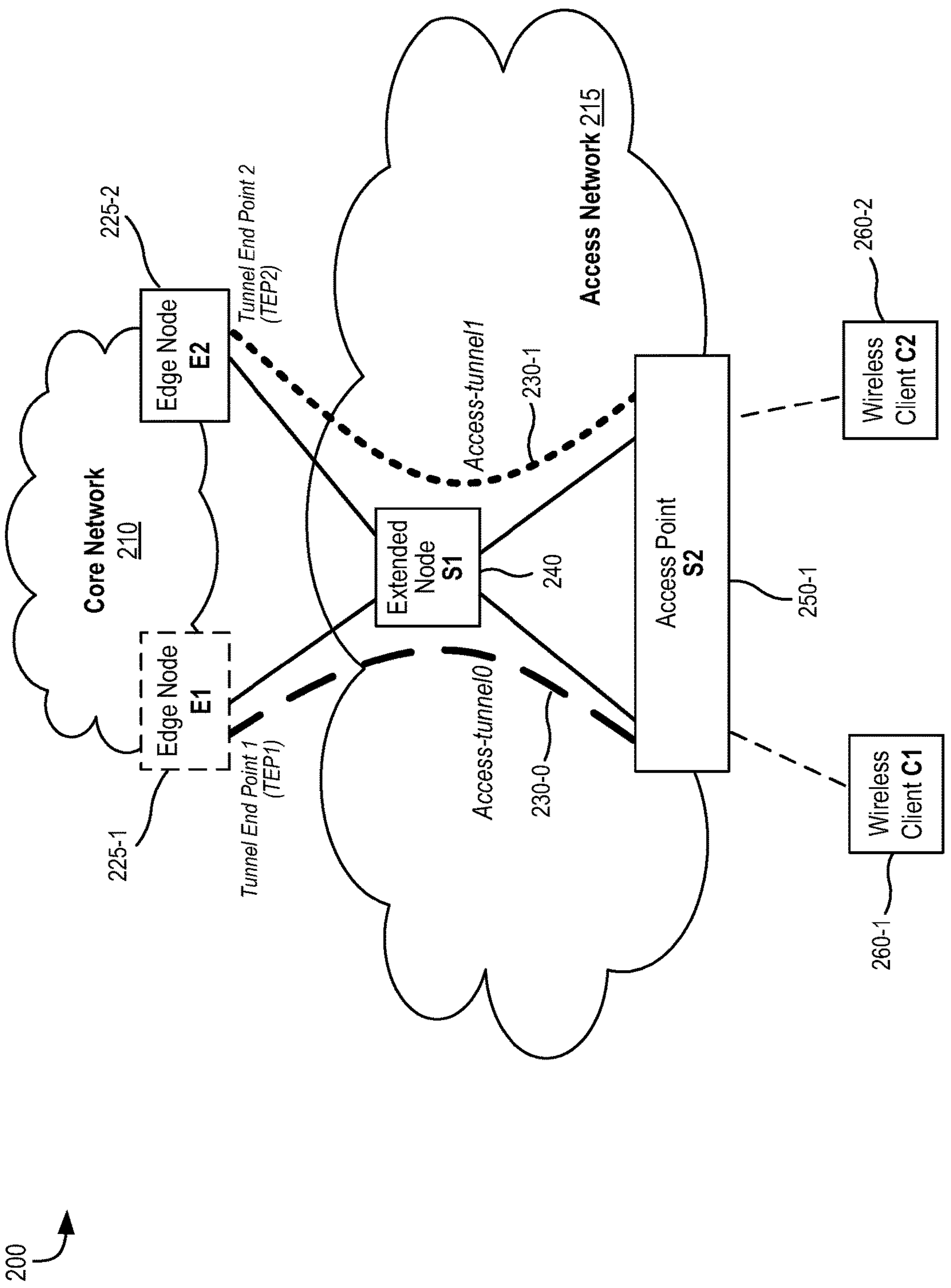
FIG. 2 is a diagram illustrating an example of a software-defined access (SDA) overlay network including an overlay core network and an overlay access network, with point-to-point overlay access tunnels between fabric edge nodes and wireless access points (APs), in accordance with some aspects of the present technology.

FIG. 2 is a diagram illustrating an example of a software-defined access (SDA) overlay network 200 including an overlay core network 210 and an overlay access network 215, with point-to-point overlay access tunnels between fabric edge nodes and wireless access points (APs), in accordance with some aspects of the present technology. Although the overlay network 200 is described below in the context of an example SDA overlay network, it is appreciated that various other types or configurations of overlay networks can also be utilized without departing from the scope of the present disclosure. As illustrated, the core network 210 can be associated with (e.g., can include) a first edge node E1 225-1 and a second edge node E2 (225-2). The first and second edge nodes, E1 and E2, can also be referred to as fabric edge nodes, as the edge nodes E1 and E2 span or otherwise couple the border between the core network 210 and the access network 215.

The access network 215 can be an overlay access network that is associated with the core network 210. For example, the access network 215 can be used to connect the core network 210 with various wireless client devices (e.g., wireless client C1 260-1, wireless client C2 260-2, etc.) and/or other devices on or attached to the access network 215. In other words, wireless clients C1 and C2 can reach the core network 210 via the access network 215, and vice versa.

In some aspects, the wireless clients C1, C2 may utilize one or more access tunnels to traverse the access network 215 and communicate with the core network 210 (and more particularly, to reach the edge nodes E1, E2 as the respective tunnel end points (TEPs) for the access tunnels). In some embodiments, the access tunnels can be point-to-point access tunnels.

For example, access tunnels can be implemented as point-to-point tunnels between wireless access points (APs) of the access network 215 and fabric edge nodes of the core network 210. In one illustrative example, a first access tunnel 230-0 (e.g., access-tunnel0 of FIG. 2) can be implemented as a point-to-point access tunnel between AP S2 (250-1) and edge node E1 (225-1), where access-tunnel0 is associated with a tunnel endpoint address TEP1 corresponding to the fabric edge node E1. A second access tunnel 230-1 (e.g., access-tunnel1 of FIG. 2) can be implemented as a point-to-point access tunnel between the AP S2 (250-1) and edge node E2 (225-2), where access-tunnel1 is associated with a tunnel endpoint address TEP2 corresponding to the fabric edge node E2.

In some examples, access-tunnel0 and access-tunnel1 may traverse the access network 215 between the AP S2 at a first end and their respective fabric edge node E1/E2 at a second end (e.g., the tunnel endpoint address TEP1/TEP2). For example, access-tunnel0 and access-tunnel1 may include, traverse, or otherwise be associated with one or more EN or PEN nodes of the access network 215. For instance, the access network 215 is shown in FIG. 2 as including an extended node (EN) S1 240, where the EN S1 node 240 connects the AP S2 and the fabric edge nodes E1, E2. In other words, the EN S1 node 240 can be linked or communicatively coupled with a plurality of wireless APs of the access network 215 (e.g., wireless AP S2 250-1, etc.) and with a plurality of fabric edge nodes of the core network 210 (e.g., fabric edge node E1 225-1 and fabric edge node E2 225-2, etc.). The access-tunnel0 and the access-tunnel1 can both include or pass through the EN node 240, as illustrated in FIG. 2.

In some aspects, the EN S1 node 240 is an extended node (e.g., L2 switch), and can implement or include a switch or switching mechanism, and may be configured to provide a fast active-standby link redundancy mechanism. For example, the EN S1 node 240 can implement a fast active-standby link redundancy mechanism that is the same as or similar to that described above with respect to FIG. 1 and the fast active-standby link redundancy mechanism 100.

The fabric edge nodes E1, E2 may be associated with a wireless controller (not shown in FIG. 2), wherein the wireless controller is used to designate one of the fabric edge nodes E1 or E2 as an Active node and the remaining fabric edge node as a Standby node. The wireless controller can be included in the core network 210 and/or can be implemented separately from (e.g., external or remote to, etc.) the core network 210. The wireless controller may be associated with the core network 210, may be associated with the access network 215, and/or may be associated with both the core network 210 and the access network 215.

Based on the Active or Standby role configured for the fabric edge node E1 or E2 at the respective tunnel endpoint (e.g., TEP1 or TEP2) for the corresponding access tunnel terminating at each fabric edge node (e.g., access-tunnel0 or access-tunnel 1), a corresponding Active/Standby status or role may be configured for the access tunnels across the access network 215. For example, in the particular example of FIG. 2, the fabric edge node E1 is configured as the Active node, and the corresponding access-tunnel0 is shown as the Active tunnel; the fabric edge node E2 is therefore configured as the Standby node, and the corresponding access-tunnel1 is shown as the Standby tunnel.

With fabric edge node E1 and access-tunnel0 in the Active role, wireless clients (e.g., the connected wireless clients C1, C2 of the AP S2; etc.), the access-tunnel0, fabric edge node E1 and wireless AP S2 are used to connect the wireless clients to the core network 210. In some aspects, because access-tunnel0 is a point-to-point tunnel, the IP addresses of the peer are known. However, as mentioned previously, there is a need for systems and techniques that can be used to provide redundancy for connected devices (e.g., wireless clients C1, C2; etc.) in the event that the Active node (e.g., in this example, the fabric edge node E1) goes down (node redundancy).

For example, the presence of the EN/PEN node S1 (240) between the wireless AP S2 (250-1) and the fabric edge nodes E1, E2 (225-1, 225-2) means that the AP S2 is not connected directly to the fabric edge nodes. Accordingly, the AP S2 will not be able to detect when or if its link to the fabric edge node goes down (e.g., either due to link failure or fabric edge node failure). As such, if the currently Active fabric edge node E1 goes down (and/or if the access-tunnel0 goes down, and/or if one of the links to or from EN/PEN node S1 goes down, etc.), the AP S2 will be unable to detect the link failure, and will continue to send traffic using access-tunnel0 and TEP1. Such traffic will be blackholed, and will not reach the core network 210. For instance, the systems and techniques described herein can be used to provide access tunnel link redundancy and rapid convergence during link and node failures in the wireless SDA environment 200. Without the solution, during a link or node failure impacting the access tunnel between the wireless AP S2 and one of the fabric edge nodes E1, E2, the intermediate EN/PEN node S1 (e.g., L2 switch) will cause the wireless AP to still see its link to the fabric edge node as being alive—and accordingly, traffic to or from the wireless clients C1, C2 connected to that wireless AP would be blackholed.

Figure 3A:
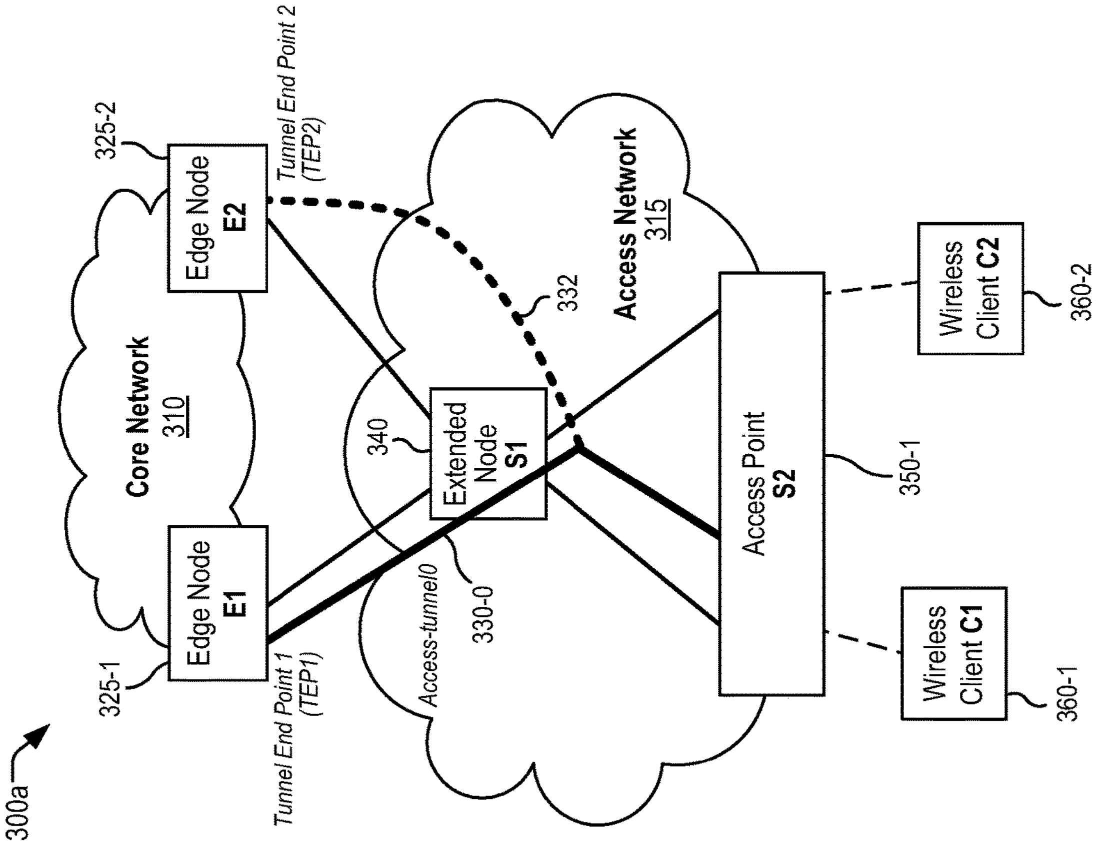
FIGS. 3A and 3B are diagrams illustrating an example of node and link redundancy for the overlay access tunnels and wireless APs of the SDA overlay network of FIG. 2, in accordance with some aspects of the present technology.
Figure 3B:
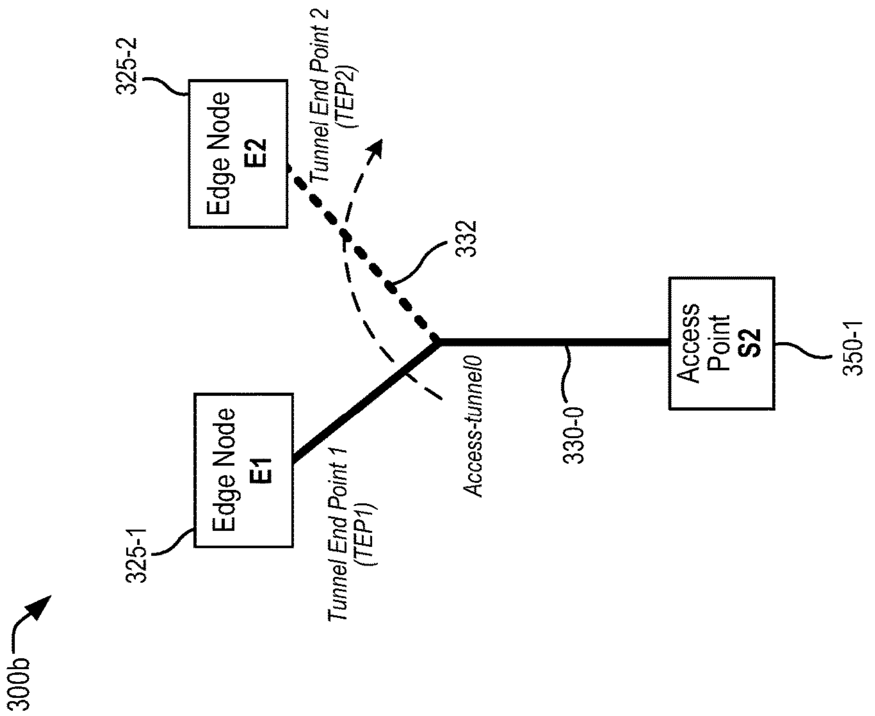

FIGS. 3A and 3B are diagrams illustrating an example of node and link redundancy for the overlay access tunnels and wireless APs of the SDA overlay network of FIG. 2, in accordance with some aspects of the present technology. For example, FIG. 3A depicts an SDA overlay network 300*a* that may be the same as or similar to the SDA overlay network 200 of FIG. 2. FIG. 3B depicts a simplified view 300*b* of the SDA overlay network 300*a* shown in FIG. 3A, with like reference numerals used to refer to like components across FIG. 3A and FIG. 3B.

The core network 310 of FIG. 3A can be the same as or similar to the core network 210 of FIG. 2. The edge nodes E1 (325-1) and E2 (325-2) of FIGS. 3A-3B can be the same as or similar to the edge nodes E1 (225-1) and E2 (225-2), respectively, of FIG. 2. The access-tunnel0 (330-0) of FIGS. 3A-3B can be the same as or similar to the access-tunnel0 (230-0) of FIG. 2. The TEP1 and TEP2 of FIGS. 3A-3B can be the same as or similar to the TEP1 and TEP2, respectively, of FIG. 2. The EN node S1 340 of FIG. 3A can be the same as or similar to the EN node S1 240- of FIG. 2. The overlay access network 315 of FIG. 3A can be the same as or similar to the overlay access network 215 of FIG. 2. The access point S2 (350-1) of FIGS. 3A-3B can be the same as or similar to the access point S2 (250-1) of FIG. 2. The wireless clients C1 (360-1) and C2 (360-2) of FIG. 3A can be the same as or similar to the wireless clients C1 (260-1) and C2 (260-2), respectively, of FIG. 2.

Continuing in the example introduced with respect to FIG. 2, in which the fabric edge node E1 is the currently Active node and access-tunnel0 is the currently Active tunnel, at which point one (or both) of fabric edge node E1 and access-tunnel0 experience a node or link failure (respectively), the systems and techniques can provide dual-homing capability for the wireless APs in the SDA network by leveraging the fast active-standby link redundancy mechanism running on the EN/PEN node S1, as described in greater detail below.

In one illustrative example, the access tunnels access-tunnel0, access-tunnel1 are provisioned to the fabric edge nodes E1, E2 (respectively) according to the Active or Standby role configured for each respective fabric edge node in the EN/PEN node S1. In other words, the access tunnels are provisioned to match the configured Active or Standby role of the fabric edge node that is the endpoint of the respective access tunnel.

Figure 4:
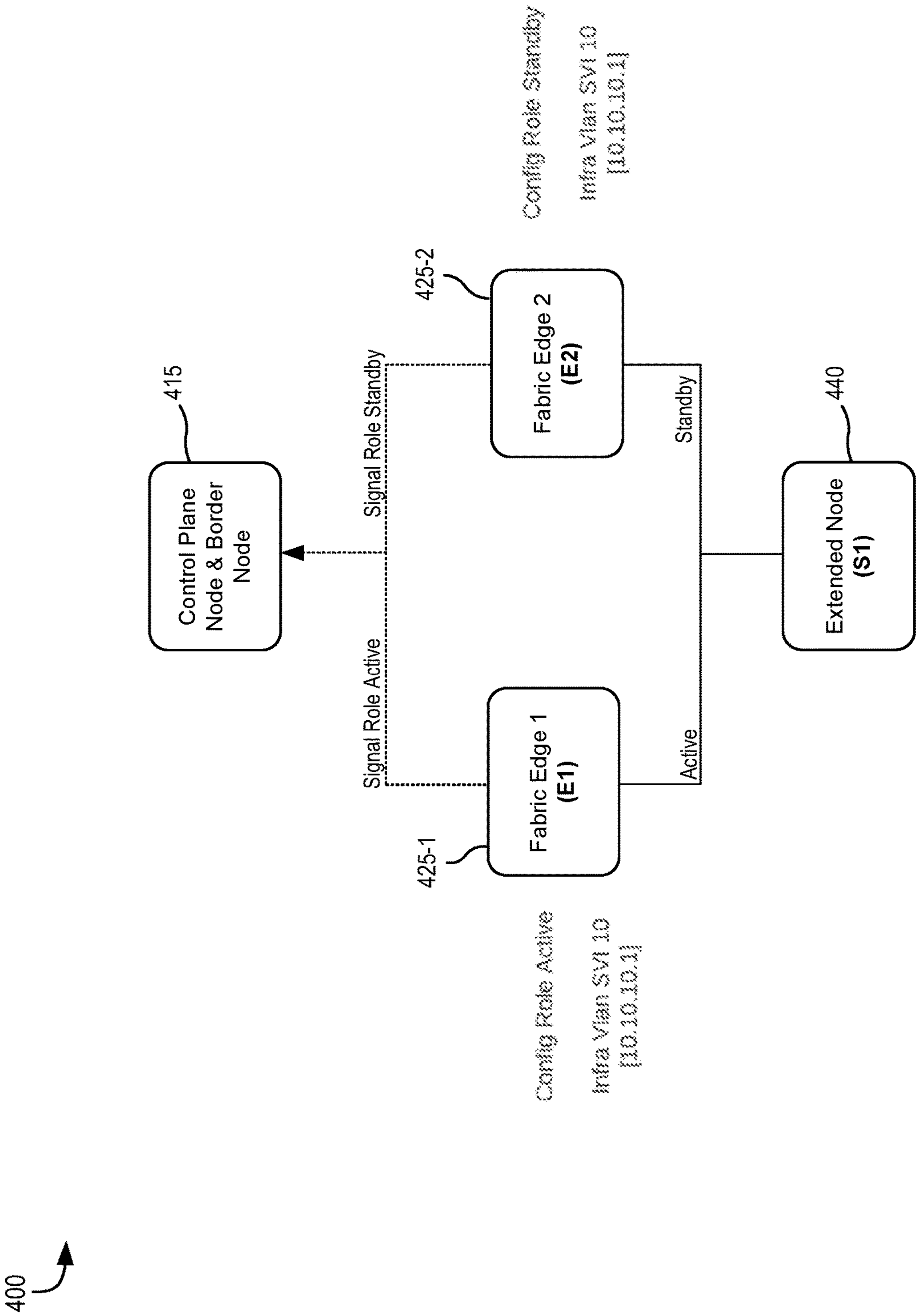
FIG. 4 is a diagram illustrating an example of role registration between fabric edge nodes of an SDA overlay network and a control plane node and border node, in accordance with some aspects of the present technology.

For example, FIG. 4 is a diagram 400 illustrating an example of role registration between fabric edge nodes of an SDA overlay network and a control plane node and/or a border node, in accordance with some aspects of the present technology. A control plane node and border node 415 can be provided, and in at least some embodiments may comprise a combined control plane node and border node. In some cases, the control plane node and border node 415 can be implemented as a single node, configured to provide combined functionality of a control plane node and a border node. In some examples, the control plane node and border node 415 can be implemented as a separate control plane node and a separate border node. As used herein, the control plane node and border node 415 may also be referred to as a "control plane and border node" 415. In some aspects, the control plane and border node 415 can communicate with a fabric edge node E1 (425-1) and a fabric edge node E2 (425-2) to obtain or otherwise receive information indicative of whether each fabric edge node E1, E2 is configured with an Active role or is configured with a Standby role. In some embodiments, the choice between the Active role configuration or Standby role configuration for the fabric edge nodes E1, E2 is signaled by an extended node S1 (440) that is communicatively coupled with both fabric edge nodes E1, E2.

In some aspects, the control plane and border node 415 of FIG. 4 can be included in or associated with the core network 210 of FIG. 2 and/or the core network 310 of FIG. 3. The fabric edge node E1 (425-1) of FIG. 4 can be the same as or similar to the fabric edge node E1 (225-1) of FIG. 2 and/or the fabric edge node E1 (325-1) of FIGS. 3A-3B. The fabric edge node E1 (425-2) of FIG. 4 can be the same as or similar to the fabric edge node E2 (225-2) of FIG. 2 and/or the fabric edge node E2 (325-2) of FIGS. 3A-3B. The extended node S1 (440) of FIG. 4 can be the same as or similar to the extended node S1 (240) of FIG. 2 and/or the extended node S1 (340) of FIG. 3A.

For example, as illustrated in FIG. 4, the first fabric edge node E1 (425-1) is configured as Active by the extended node S1 (440) and the second fabric edge node E2 (425-2) is configured as Standby by the extended node S1 (440). The first fabric edge node E1 (425-1) can signal its configured Active role to the control plane and border node 415, and the second fabric edge node E2 (425-2) can signal its configured Standby role to the control plane and border node 415. Accordingly, a first access tunnel (e.g., access-tunnel0) from the EN node S1 (440) to fabric edge node E1 (425-1) can be provisioned as an Active access tunnel and a second access tunnel (e.g., access-tunnel1) from the EN node S1 (440) to fabric edge node E2 (425-2) can be provisioned as a Standby access tunnel.

For example, the access tunnels can be provisioned to the two fabric edge nodes E1, E2 to match the EN/PEN nodes (e.g., EN S1) Active and Standby roles for the two fabric edge nodes, as seen by the EN and PEN. In particular, when performing a configuration of the fast active-standby link redundancy mechanism implemented by the EN S1 node (or other EN/PEN nodes of the SDA or overlay network) that connects to the two fabric edge nodes E1, E2, on the specific physical ports, the same roles (Active or Standby) can be configured on the two fabric edge nodes E1, E2. In one illustrative example, the respective Active or Standby role can be registered with the control plane (e.g., the control plane and border node 415 of FIG. 4) by the respective fabric edge nodes E1, E2. The control plane (e.g., control plane and border node 415 of FIG. 4) may use the Active and Standby role of the fabric edge nodes E1, E2 to send notifications to both the fabric edge nodes E1, E2 to setup the access tunnels (e.g., access-tunnel0, access-tunnel1) and manage the life-cycle of the access tunnels.

Returning to the discussion of FIGS. 3A and 3B, the access-tunnel0 (330-0) link from EN S1 (340) to fabric edge node E1 (325-1) and TEP1 is initially configured or registered in the Active role, while the access-tunnel1 (332) link from EN S1 (340) to fabric edge node E2 (325-2) and TEP2 is initially configured or registered in the Standby role.

As noted previously, the TEP1 address (associated with fabric edge node E1 (325-1) and access-tunnel0) is different from the TEP2 address (associated with the fabric edge node E2 (325-2) and access-tunnel1). Accordingly, the systems and techniques can be used to provide a virtual IP address (e.g., Anycast IP address and/or Media Access Control (MAC) address) to the wireless AP S2 (350-1) at the other ends of the respective access tunnels. In particular, the virtual IP address is provided to the AP S2 for the access tunnel end points TEP1 and TEP2, such that the AP S2 can continue to send traffic (e.g., to the virtual IP address, rather than the underlying TEP1 or TEP2 address) during the link and node failure of the Active fabric edge node E1 or E2.

For instance, a virtual IP address (e.g., Anycast IP and/or Media Access Control (MAC) address) is provided to the wireless AP S2 for the access tunnel end points, so that the AP S2 can continue to send traffic during link and/or node failure of the Active fabric edge node and corresponding access tunnel. In other words, the same virtual IP address is attached to both the Active and the Standby fabric edge nodes/access tunnels. In this manner, the wireless AP S2 does not see the two different fabric edge nodes E1, E2 or the two different access tunnels (access-tunnel0, access-tunnel1) that are used for link redundancy—the wireless AP S2 instead sees only the single virtual IP address that it uses to communicate with the fabric edge and core network 310.

Figure 5:
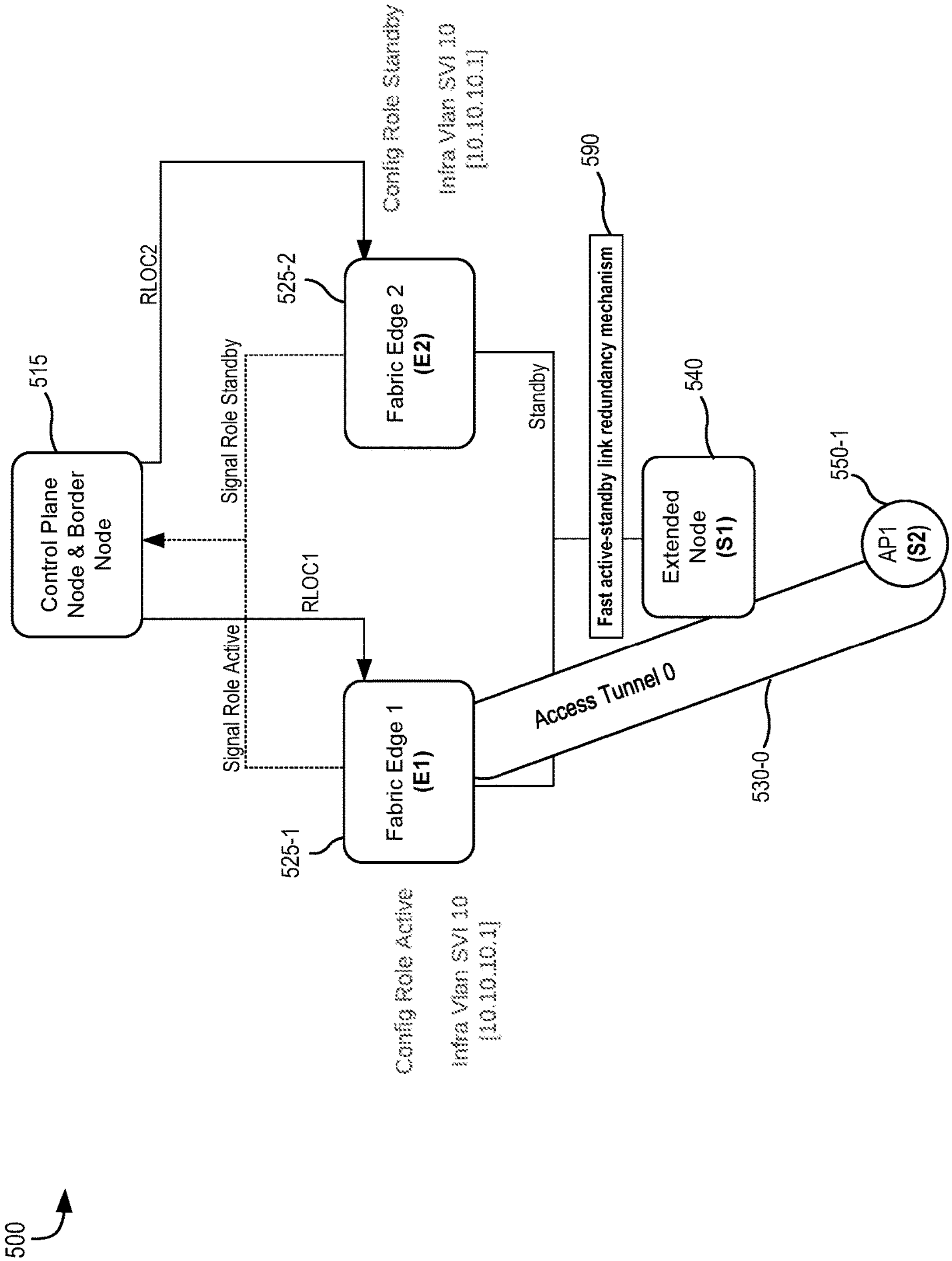
FIG. 5 is a diagram illustrating an example of a first point-to-point overlay access tunnel from a wireless AP to a first fabric edge node in an SDA overlay network, in accordance with some aspects of the present technology.

For example, FIG. 5 is a diagram 500 illustrating an example of a first point-to-point overlay access tunnel from a wireless AP to a first fabric edge node in an SDA overlay network, in accordance with some aspects of the present technology. In some cases, the control plane and border node 515 of FIG. 5 can be implemented as a combined control plane node and border node, or may represent separate control plane and border nodes. In some aspects, the control plane and border node 515 of FIG. 5 can be the same as or similar to the control plane and border node 415 of FIG. 4. The fabric edge node E1 (525-1) of FIG. 5 can be the same as or similar to the fabric edge node E1 (425-1) of FIG. 4. The fabric edge node E2 (525-2) of FIG. 5 can be the same as or similar to the fabric edge node E2 (425-2) of FIG. 4. The extended node S1 (540) of FIG. 5 can be the same as or similar to the extended node S1 (440) of FIG. 4.

In some cases, the control plane and border node 515 can be configured to provide first Routing Locator information (RLOC1) to the first fabric edge node E1 (525-1), and can be configured to provide second Routing Locator information (RLOC2) to the second fabric edge node E2 (525-2). The RLOC information (RLOC1, RLOC2) can be used to separate the identity of a network node (e.g., E1 and E2, and/or corresponding endpoint ID (EID) information for fabric edge nodes E1 and E2) from the routing location of the network node within the network (e.g., the RLOC1, RLOC2 information from the control plane and border node 515). For example, the use of the RLOC information RLOC1, RLOC2 can be different from traditional IP networking, wherein an IP address serves both as an identity of a host and the host's location in the network.

FIG. 5 additionally depicts the inclusion of a fast active-standby link redundancy mechanism 590 that is associated with and/or implemented by (or configured for) the extended node S1 (540). The fast active-standby link redundancy mechanism 590 can be the same as or similar to the fast active-standby link redundancy mechanism 100 described previously above with respect to FIG. 1, etc. The EN S1 (540) of FIG. 5 is associated with and communicatively coupled to a wireless AP S2 (550-1), which may be the same as or similar to the wireless AP S2 (250-1) of FIG. 2; the wireless AP S2 (350-1) of FIG. 3A; the wireless AP S2 (350-1) of FIG. 3B; etc. A first access tunnel, access-tunnel0 (530-0) is provided between AP S2 (550-1) and fabric edge node E1 (525-1) of FIG. 5, and may be the same as or similar to the access-tunnel0 (230-0) of FIG. 2, the access-tunnel0 (330-0) of FIGS. 3A-3B, etc.

In one illustrative example, each tunnel endpoint (e.g., each of fabric edge node E1 (525-1) and E2 (525-2)) can be associated to the same virtual IP address provided by the EN S1 (540) to the wireless AP S2 (550-1). In the example of FIG. 5, both the Active and Standby fabric edge nodes E1, E2 (and accordingly, both the Active and Standby tunnel endpoint address TEP1 and TEP2; as well as both the Active and Standby access-tunnel0 and the access-tunnel1) are attached to the same virtual IP address [10.10.10.1].

The use of the virtual IP address can avoid a challenge that may otherwise appear if the AP S2 uses the fabric edges E1, E2 loopback IP as the Tunnel Destination to send the traffic to the fabric edge. Such a configuration will not work, as the IP will not be reachable when the link or node failure occurs. Accordingly, the systems and techniques can be configured to not use the Loopback Address (e.g., E1, E2 loopback IP). Instead, the AP S2 can be configured to use the Anycast IP address (or other configured virtual IP address) for the infrastructure VLAN (e.g., setup across the entire fabric of the SDA or overlay network 200, 300*a*, etc.). In some aspects, the AP S2 learns the Anycast IP address for the infra VLAN from a DHCP response while the AP S2 is getting the IP address. Accordingly, in this manner, the AP S2 can continue to send traffic addressed to the Anycast IP (or other virtual IP address configured according to aspects of the present disclosure), and the EN or PEN node (e.g., EN S1 (540)) can use the fast active-standby link redundancy mechanism 590 to steer the traffic automatically to the Standby fabric edge node (e.g., fabric edge node E2 (325-2 of FIGS. 3A-3B, 425-2 of FIG. 4, 525-2 of FIG. 5, etc.) in the event of the Primary/Active fabric edge node (e.g., fabric edge node E1 325-1 of FIGS. 3A-3B, 425-1 of FIG. 4, 525-1 of FIG. 5, etc.) failing (e.g., planned or unplanned, and/or link failure).

Accordingly, the systems and techniques can be used to provide a virtual IP address (e.g., Anycast IP and/or MAC address) to the AP S2 for the access-tunnel endpoints so that the AP S2 can continue to send traffic during the link and node failure of the Active fabric edge (e.g., E1 or E2), as described above.

In some aspects, the systems and techniques can additionally implement a signaling technique to control the fabric edge nodes E1, E2 and their respective configuration as either an Active role or a Standby role, where the signaling technique can further be used to trigger or otherwise indicate to the fabric edge nodes E1, E2 when to switch roles upon a detected link or node failure. For instance, switching roles between the fabric edge nodes E1, E2 can include the Active node switching to a Standby role, and the Standby node switching to an Active role. For example, upon link or node failure for the currently Active fabric edge node E1, the systems and techniques can trigger or cause the transitions: E1 (Active role)→E1 (Standby role), and E2 (Standby role)→E2 (Active role). Similarly, the transitions may include access-tunnel0 (Active role)→access-tunnel0 (Standby role), and access-tunnel1 (Standby role)→access-tunnel1 (Active role).

Figure 6:
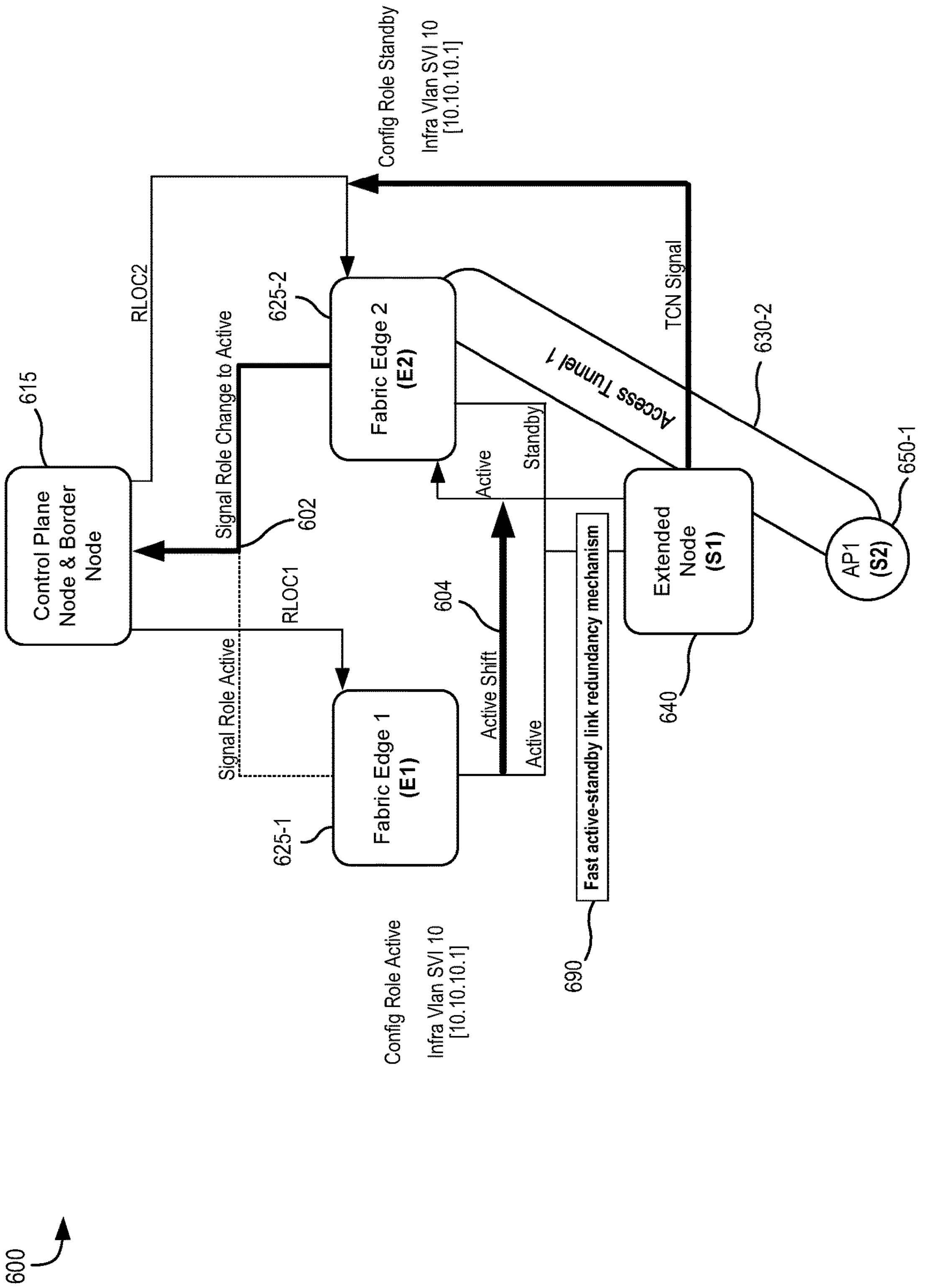
FIG. 6 is a diagram illustrating an example of link redundancy and overlay access tunnel shifting upon active link/node failure corresponding to a shift from a first point-to-point overlay access tunnel of a first fabric edge node to a second point-to-point overlay access tunnel of a second fabric edge node in the same SDA overlay network, in accordance with some aspects of the present technology.

For example, the following discussion makes reference to the examples of FIGS. 3A and 3B, as well as FIG. 6. FIG. 6 is a diagram 600 illustrating an example of link redundancy and overlay access tunnel shifting upon active link/node failure corresponding to a shift from a first point-to-point overlay access tunnel of a first fabric edge node to a second point-to-point overlay access tunnel of a second fabric edge node in the same SDA overlay network, in accordance with some aspects of the present technology. FIG. 6 includes a control plane and border node 615 that can be implemented as a combined control plane node and border node, or may represent separate control plane and border nodes. In some aspects, the control plane and border node 615 of FIG. 6 can be the same as or similar to the control plane and border node 415 of FIG. 4 and/or the control plane and border node 515 of FIG. 5; fabric edge nodes E1 (625-1) and E2 (625-2) that may be the same as or similar to the fabric edge nodes E1 (325-1 of FIGS. 3A-3B, 425-1 of FIG. 4, 525-1 of FIG. 5) and E2 (325-2 of FIGS. 3A-3B, 425-2 of FIG. 4, 525-2 of FIG. 5), respectively; extended node S1 (640) that may be the same as or similar to the extended node S1 (340 of FIG. 3A, 440 of FIG. 4, 540 of FIG. 5); wireless AP S2 (650-1) that may be the same as or similar to the wireless AP S2 (350-1 of FIG. 3A, 550-1 of FIG. 5); and a fast active-standby link redundancy mechanism 690 that may be the same as or similar to the fast active-standby link redundancy mechanism 100 of FIGS. 1 and/or 590 of FIG. 5, etc. FIG. 6 further illustrates a second access tunnel, access-tunnel1 (630-2), between AP S2 (650-1) and fabric edge node E2 (625-2), which may be the same as or similar to the access-tunnel1 (230-2) of FIG. 2, and/or the access-tunnel-1 (332) of FIGS. 3A-3B, etc.

In some aspects, a wireless controller associated with the SDA network can be used to implement the signaling to control the fabric edge nodes E1, E2 to be configured with either an Active role or Standby role (and to trigger the switching of roles upon link or node failure for the current Active). The wireless controller may be included in or implemented by the control plane and border node 615 and/or may be included in, implemented by, or associated with the core network 315, etc. In some aspects, the controller is used to implement signaling to control the fabric edge nodes E1 and E2, indicating information such as which of the two fabric edge nodes has been configured as Active and which has been configured as Standby. Additionally, the wireless controller may signal or trigger when to switch the roles upon failure of the Active link (e.g., Active access tunnel) and/or failure of the Active node (e.g., Active fabric edge node).

In some embodiments, the EN/PEN node S1 (e.g., 340 of FIG. 3A, 640 of FIG. 6, etc.) that is configured with the fast active-standby link redundancy mechanism (e.g., 690 of FIG. 6) can provide a topology change notification (TCN) signal (and/or various other notifications indicative of a topology change) during the transitioning of Active and Standby roles between the fabric edge nodes (e.g., E1 and E2) and their respective access tunnels (e.g., access-tunnel0 and access-tunnel1). For example, the TCN signal/notification indicative of the topology change is shown in FIG. 6 as being communicated between the EN S1 node (640) and the control plane and border node 615.

The TCN signal/notification indicative of the topology change can correspond to an Active Shift 604, wherein the currently Active fabric edge node is updated or shifted from fabric edge node E1 (625-1) in the Active role to instead being fabric edge node E2 (625-2) in the Active Role. For instance, the Active Shift 604 can cause fabric edge node E2 (625-2) to transition (Standby role)→(Active role).

Based on implementing the Active shift 604, the second fabric edge node E2 (625-2) becomes the newly Active role fabric edge. This new Active role for fabric edge node E2 is different from the Standby role that was originally or previously configured for fabric edge node E2 by the EN S1 node 640 (e.g., the Standby role configuration shown in FIG. 6 from EN S1 node 640 to fabric edge node E2 625-2). Accordingly, the fabric edge node E2 625-2 can transmit a role change signal 602 to the control plane and border node 615, wherein the role change signal 602 is indicative of the switch for fabric edge node E2 625-2 from the Standby role to the Active role.

In some aspects, the fast active-standby link redundancy mechanism 690 implemented by the EN S1 node (e.g., 340 of FIG. 3A, 640 of FIG. 6) can provide the TCN signal/notification indicative of the topology change during the transition or switch of Active and Standby roles between the fabric edge nodes E1 and E2. For example, upon link or node failure of the Active fabric edge node and access tunnel, the fabric edge node that is in the Standby role (e.g., E2 (325-2 in FIGS. 3A-3B, 625-2 in FIG. 6) will act on the signal to notify the control plane to signal the role change from Standby to Active for fabric edge node E2. The control plane will use this information to subsequently utilize fabric edge node E2 (now in the Active role) for future Map resolve requests with the virtual IP address attached across the two fabric edge nodes/access tunnels.

FIGS. 3A and 3B illustrate an example of the seamless switching from access-tunnel0 (330-0) and fabric edge node E1 (325-1)/TEP1 to the access-tunnel1 (332) and fabric edge node E2 (325-2)/TEP2. While using the same virtual IP address configured for both access tunnels and TEPs, the AP S2 350-1 can continue to send traffic to the core network 310 without being aware of the link or node failure of the Active, and without being aware of the switchover that is implemented to achieve the link and access tunnel redundancy described herein.

For instance, both fabric edge nodes E1 (325-1) and E2 (325-2) need to be able to terminate the point-to-point tunnel established to AP S2 (350-1). To avoid loop problems, only one TEP (e.g., of the two TEPs, TEP1 and TEP2) should be associated with an Active role at any given time. For both access-tunnel0 (330-0) and access-tunnel1 (332) to be seen as the same tunnel by AP S2 (350-1), TEP1 and TEP2 can be associated to and may utilize the same IP address. In particular, for both access-tunnel0 (330-0) and access-tunnel1 (332) to be seen as the same tunnel by AP S2 (350-1), TEP1 and TEP2 can be associated to and may utilize the same virtual IP address (e.g., Anycast IP address and/or MAC address, etc., as described previously above). Subsequently, the EN S1 node 340 can implement the fast active-standby link redundancy mechanism to control the respective Role of each of fabric edge nodes E1 (325-1) and E2 (325-2) as either Active or Standby, and to further control when to switchover the roles between the fabric edge nodes E1 and E2 (in case of link and/or node failure of the Active role).

Notably, the systems and techniques described herein can be implemented in a wired network environment, a wireless network environment, and any combination of wired and wireless network environment. The systems and techniques can provide dual-homing for wireless APs/wireless clients connected behind EN/PEN in an SDA or other overlay network, and can provide fast and seamless active-standby switching in response to link or fabric edge node failure, with sub-second convergence. The systems and techniques described herein can be transparent from the perspective of wireless APs and wireless clients, which are configured to use the same virtual IP address regardless of which fabric edge node or access tunnel is actually being used in the overlay access network in the Active role.

In some aspects, the access-tunnel redundancy and tunnel switching failover mechanisms described and implemented according to aspects of the present disclosure can be based on the fabric edges (e.g., fabric edge nodes E1 and E2 of any of FIGS. 2-6) receiving a notification indicative of the topology change (e.g., including a topology change notification (TCN), such as the TCN signal shown in FIG. 6 from the EN S1 node 640, among various other notifications indicative of a topology change). In some aspects, various different mechanisms and/or techniques can be implemented in the L2 access network to generate and transmit the TCN signal (or other signal indicative of Active to Standby role switching and/or a topology change) for the fabric edge nodes E1 and E2.

In some examples, one or more wired clients can be connected to the SDA overlay networks described herein, such as the SDA network 200 of FIG. 2, the SDA network **300*a* of FIG. 3, 300*b* of FIG. 3B, and/or any other SDA or other overlay network associated with any of FIGS. 2-6. For example, one or more wired clients can be connected to any extended node, such as the extended node S1 (e.g., 240 of FIG. 2, 340 of FIG. 3A, 440 of FIG. 4, 540 of FIG. 5, 640 of FIG. 6, etc.). In some embodiments, one or more wireless clients can be connected directly to one or more of the fabric edge nodes E1 (e.g., 225-1 of FIG. 2, 325-1 of FIGS. 3A-3B, 425-1 of FIG. 4, 525-1 of FIG. 5, 625-1 of FIG. 6) and/or E2 (e.g., 225-2 of FIG. 2, 325-2 of FIGS. 3A-3B, 425-2 of FIG. 4, 525-2 of FIG. 5, 625-2 of FIG. 6**).

The EN S1 node (e.g., 240 of FIG. 2, 340 of FIG. 3A, 440 of FIG. 4, 540 of FIG. 5, 640 of FIG. 6, etc.) can be an L2 switch. The access network (e.g., overlay access network 215 of FIG. 2, 315 of FIG. 3A, etc.) can be an access L2 network.

In some aspects, in the event of failure of fabric edge node E1, access-tunnel0 goes to fabric edge node E2, as described above and shown for example in FIGS. 3A-3B and 5-6. In some embodiments, the newly Active role fabric edge node E2 does not see a mobility event for the wireless clients C1, C2 after the switch to the Active role. For example, upon the access-tunnel0 becoming Active on fabric edge node E2, the fabric edge node E2 can generate a notification to the controller (e.g., which can be implemented as a wireless LAN controller (WLC) or various other controllers). The notification from fabric edge node E2 to the controller can be the same as, similar to, can include, and/or can be indicative of the role change signal 602 described above with respect to FIG. 6. For instance, the notification from fabric edge node E2/the role change signal 602 of FIG. 6 can update the registration of the wireless clients C1, C2 to fabric edge node E2 to multi-stage multi-path routing (MSMR), following current implementations for mobility and mobility events.

The above describes an example of northbound traffic from the AP S2 and wireless clients C1, C2 to the fabric edge nodes E1 and/or E2. The description below corresponds to an example of southbound traffic, from the fabric edge nodes E1 and/or E2 to the AP S2 and wireless clients C1, C2. For southbound traffic, initially the wireless clients (e.g., C1 and/or C2) will be registered to fabric edge node E1, which starts in the Active role prior to the node/link failure event. Following normal Locator/ID Separation Protocol (LISP) procedures, the other clients can be reached as local clients (e.g., for the clients that are on fabric edge node E1) or as remote clients (e.g., for the clients that are in another RLOC, including fabric edge node E2). Because wireless client C1 is registered to fabric edge node E1, the southbound traffic is directed to E1. Upon access-tunnel0 transitioning to the fabric edge node E2 (newly configured in the Active role, after switching from the Standby role after node/link failure for fabric edge node E1/access-tunnel0), the workflow can be the same as or similar to existing workflows for FEW mobility. MSMR can notify fabric edge node E2 that the wireless clients (e.g., C1 and/or C2, etc.) are now local to fabric edge node E2. Because fabric edge node E1 has gone down (e.g., experienced link and/or node failure), there is no SMR to notify the other RLOCs (e.g., a fabric edge node E3 for example, not illustrated). Instead, the other RLOCs (e.g., a fabric edge node E3, etc.) can detect that the fabric edge node E1 is down, and can subsequently trigger the map-request to update the cached entry. In some aspects, the other VTEPs (e.g., E3, etc.) are not topologically reachable via the access side (L2 network) nor via the fabric.

Figure 7:
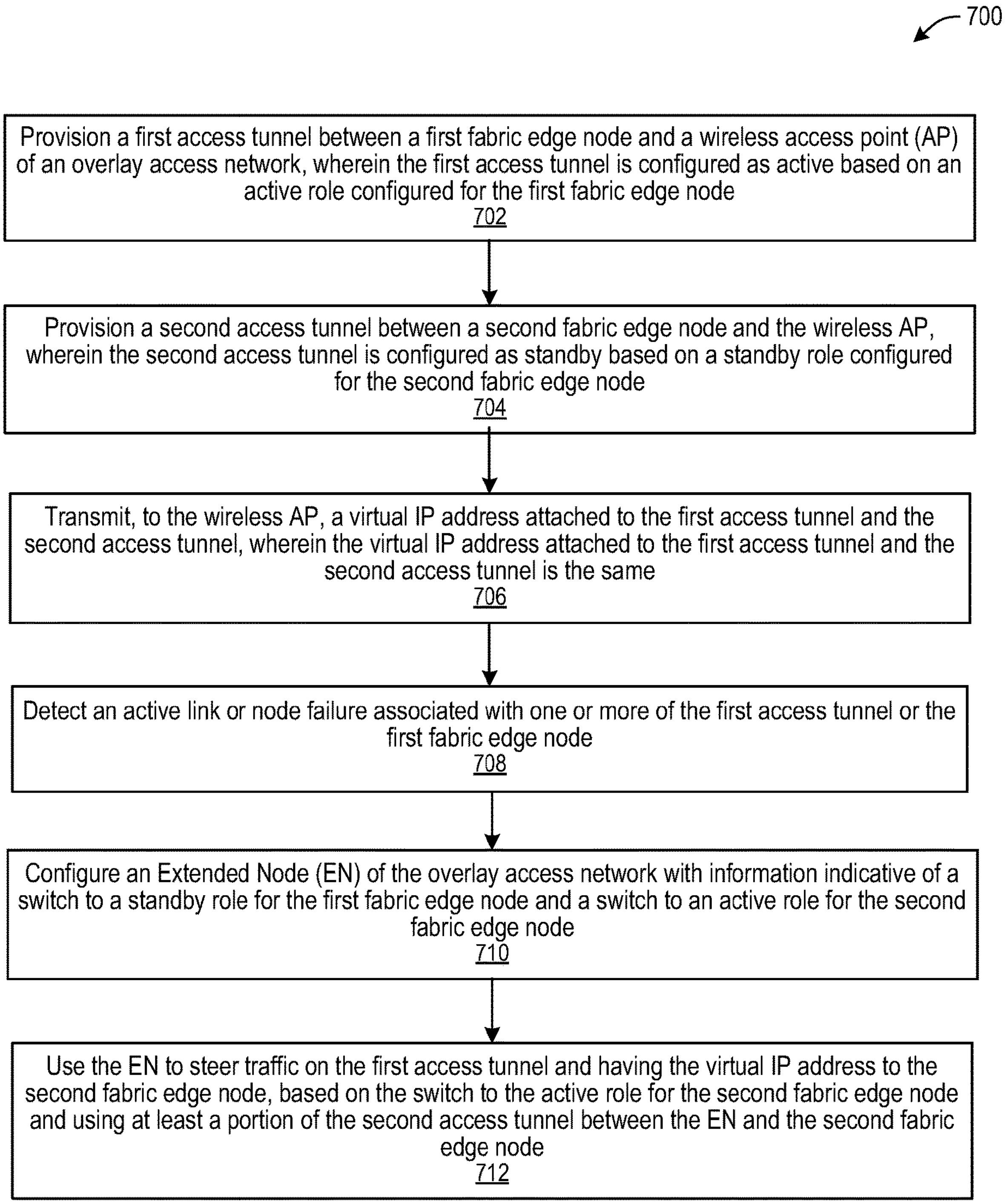
FIG. 7 illustrates a flowchart of an example process for implementing access tunnel redundancy across fabric edges, in accordance with some aspects of the present technology.

FIG. 7 illustrates a flowchart of an example process 700 for implementing access tunnel redundancy across fabric edges, in accordance with some aspects of the present technology. It is also understood that the example process 700 of FIG. 7 and/or various other processes described herein can also be implemented using one or more processors and memories having computer-readable instructions stored thereon, which when executed by the one or more processors cause the one or more processors to perform operations including some or all of process 700. Although process 700 depicts a particular sequence of operations, the sequence may be altered without departing from the scope of the present disclosure. For example, some of the operations depicted may be performed in parallel or in a different sequence that does not materially affect the function of process 700. In other examples, different components of an example device or system that implements process 700 may perform functions at substantially the same time or in a specific sequence.

At block 702, the process 700 can include provisioning a first access tunnel between a first fabric edge node and a wireless access point (AP) of an overlay access network, wherein the first access tunnel is configured as active based on an active role configured for the first fabric edge node.

At block 704, the process 700 can include provisioning a second access tunnel between a second fabric edge node and the wireless AP, wherein the second access tunnel is configured as standby based on a standby role configured for the second fabric edge node.

At block 706, the process 700 can include transmitting, to the wireless AP, a virtual IP address attached to the first access tunnel and the second access tunnel, wherein the virtual IP address attached to the first access tunnel and the second access tunnel is the same.

At block 708, the process 700 can include detecting an active link or node failure associated with one or more of the first access tunnel or the first fabric edge node.

At block 710, the process 700 can include configuring an Extended Node (EN) of the overlay access network with information indicative of a switch to a standby role for the first fabric edge node and a switch to an active role for the second fabric edge node.

At block 712, the process 700 can include using the EN to steer traffic on the first access tunnel and having the virtual IP address to the second fabric edge node, based on the switch to the active role for the second fabric edge node and using at least a portion of the second access tunnel between the EN and the second fabric edge node.

Figure 8:
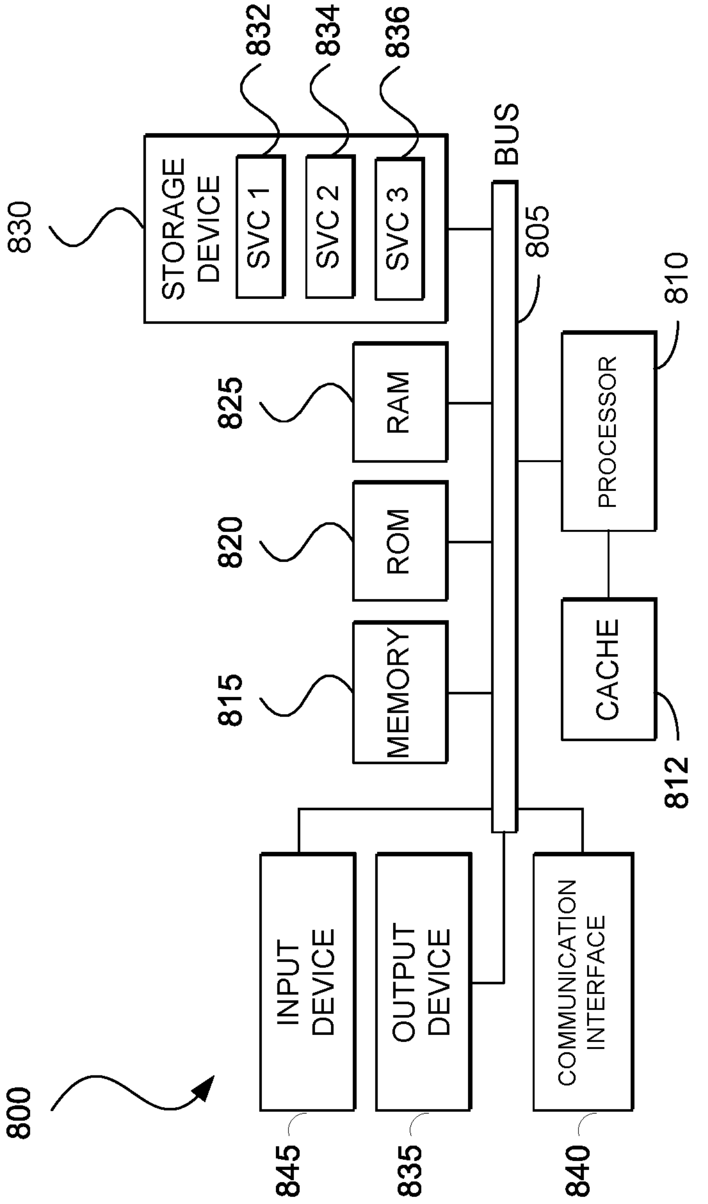
FIG. 8 is a block diagram illustrating an example of a computing system for implementing aspects of the present technology and aspects described herein.

FIG. 8 illustrates a computing system architecture, according to some aspects of the present disclosure. Components of computing system architecture 800 are in electrical communication with each other using a connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

provisioning a first access tunnel between a first fabric edge node and a wireless access point (AP) of an overlay access network, wherein the first access tunnel is configured as active based on an active role configured for the first fabric edge node;

provisioning a second access tunnel between a second fabric edge node and the wireless AP, wherein the second access tunnel is configured as standby based on a standby role configured for the second fabric edge node;

transmitting, to the wireless AP, a virtual IP address attached to the first access tunnel and the second access tunnel, wherein the virtual IP address attached to the first access tunnel and the second access tunnel is the same;

detecting an active link or node failure associated with one or more of the first access tunnel or the first fabric edge node;

configuring an Extended Node (EN) of the overlay access network with information indicative of a switch to a standby role for the first fabric edge node and a switch to an active role for the second fabric edge node; and using the EN to steer traffic on the first access tunnel and having the virtual IP address to the second fabric edge node, based on the switch to the active role for the second fabric edge node and using at least a portion of the second access tunnel between the EN and the second fabric edge node, wherein, prior to detecting the active link or node failure: the EN is configured with information indicative of the active role for the first fabric edge node and the standby role for the second fabric edge node, and steers traffic from the wireless AP on the first access tunnel and having the virtual IP address to the first fabric edge node based on the active role configured for the first fabric edge node and without using the second access tunnel.

2. The method of claim 1, wherein the virtual IP address is attached to a first tunnel endpoint (TEP) associated with the first fabric edge node and a second TEP associated with the second fabric edge node, and wherein wireless clients associated with the wireless AP are configured to use the virtual IP address to communicate with a fabric edge without using the first TEP or the second TEP.

3. The method of claim 1, wherein the EN is configured with information indicative of a switch to a standby role for the first access tunnel provisioned for the first fabric edge node and a switch to an active role for the second access tunnel provisioned for the second fabric edge node.

4. The method of claim 1, wherein the EN is configured to transmit a notification indicative of a topology change to the first fabric edge node and the second fabric edge node, wherein the notification indicative of the topology change includes the information indicative of the switch to the standby role for the first fabric edge node and the switch to the active role for the second fabric edge node.

5. The method of claim 4, wherein the second fabric edge node transmits a notification to a control plane associated with the overlay access network and an overlay core network including the first and second fabric edge nodes, wherein the notification to the control plane signals the switch from the standby role to the active role for the second fabric edge node.

6. The method of claim 4, wherein the first fabric edge node is configured to switch from the active role to the standby role based on receiving the notification indicative of the topology change from the EN, and wherein the second fabric edge node is configured to switch from the standby role to the active role based on receiving the notification indicative of the topology change from the EN.

7. The method of claim 1, wherein the EN includes a fast active-standby link redundancy mechanism to reconfigure one or more of the first fabric edge node or the first access tunnel with the standby role based on detecting the active link or node failure, and to reconfigure one or more of the second fabric edge node or the second access tunnel with the active role based on detecting the active link or node failure.

8. The method of claim 1, wherein detecting the active link or node failure is based on signaling between the EN and one or more of the first fabric edge node or the second fabric edge node.

9. The method of claim 1, wherein the first access tunnel is provisioned based on an active role or a standby role configured for the first fabric edge node by the EN, and wherein the second access tunnel is provisioned based on a standby role or an active role configured for the second fabric edge node by the EN.

10. The method of claim 1, wherein the first fabric edge node and the second fabric edge node are included in an overlay core network associated with the overlay access network.

11. The method of claim 1, wherein:

the EN is included along a path of the first access tunnel between the first fabric edge node and the wireless AP; and the EN is included along a path of the second access tunnel between the second fabric edge node and the wireless AP.

12. The method of claim 11, wherein the EN is configured to steer traffic from wireless clients of the wireless AP to the first fabric edge node or the second fabric edge node using a selected one of the first access tunnel or the second access tunnel, based on the EN being included along the path of the first access tunnel and being included along the path of the second access tunnel.

13. The method of claim 1, wherein the EN comprises a Policy Extended Node (PEN).

14. A system comprising:

one or more processors; and one or more computer-readable storage media having computer-readable instructions stored thereon, wherein the computer-readable instructions, when executed by the one or more processors, cause the one or more processors to:

provision a first access tunnel between a first fabric edge node and a wireless access point (AP) of an overlay access network, wherein the first access tunnel is configured as active based on an active role configured for the first fabric edge node;

provision a second access tunnel between a second fabric edge node and the wireless AP, wherein the second access tunnel is configured as standby based on a standby role configured for the second fabric edge node;

transmit, to the wireless AP, a virtual IP address attached to the first access tunnel and the second access tunnel, wherein the virtual IP address attached to the first access tunnel and the second access tunnel is the same;

detect an active link or node failure associated with one or more of the first access tunnel or the first fabric edge node;

configure an Extended Node (EN) of the overlay access network with information indicative of a switch to a standby role for the first fabric edge node and a switch to an active role for the second fabric edge node; and use the EN to steer traffic on the first access tunnel and having the virtual IP address to the second fabric edge node, based on the switch to the active role for the second fabric edge node and using at least a portion of the second access tunnel between the EN and the second fabric edge node, wherein, prior to detection of the active link or node failure, the EN: is configured with information indicative of the active role for the first fabric edge node and the standby role for the second fabric edge node, and is configured to steer traffic from the wireless AP on the first access tunnel and having the virtual IP address to the first fabric edge node based on the active role configured for the first fabric edge node and without using the second access tunnel.

15. The system of claim 14, wherein the virtual IP address is attached to a first tunnel endpoint (TEP) associated with the first fabric edge node and a second TEP associated with the second fabric edge node, and wherein wireless clients associated with the wireless AP are configured to use the virtual IP address to communicate with a fabric edge without using the first TEP or the second TEP.

16. The system of claim 14, wherein the EN is configured with information indicative of a switch to a standby role for the first access tunnel provisioned for the first fabric edge node and a switch to an active role for the second access tunnel provisioned for the second fabric edge node.

17. The system of claim 14, wherein the EN is configured to transmit a notification indicative of a topology change to the first fabric edge node and the second fabric edge node, wherein the notification indicative of the topology change includes the information indicative of the switch to the standby role for the first fabric edge node and the switch to the active role for the second fabric edge node.

18. One or more non-transitory computer-readable media comprising computer-readable instructions, which when executed by one or more processors, cause the one or more processors to:

provision a first access tunnel between a first fabric edge node and a wireless access point (AP) of an overlay access network, wherein the first access tunnel is configured as active based on an active role configured for the first fabric edge node;

provision a second access tunnel between a second fabric edge node and the wireless AP, wherein the second access tunnel is configured as standby based on a standby role configured for the second fabric edge node;

transmit, to the wireless AP, a virtual IP address attached to the first access tunnel and the second access tunnel, wherein the virtual IP address attached to the first access tunnel and the second access tunnel is the same;

detect an active link or node failure associated with one or more of the first access tunnel or the first fabric edge node;

configure an Extended Node (EN) of the overlay access network with information indicative of a switch to a standby role for the first fabric edge node and a switch to an active role for the second fabric edge node; and use the EN to steer traffic on the first access tunnel and having the virtual IP address to the second fabric edge node, based on the switch to the active role for the second fabric edge node and using at least a portion of the second access tunnel between the EN and the second fabric edge node, wherein, prior to detection of the active link or node failure, the EN: is configured with information indicative of the active role for the first fabric edge node and the standby role for the second fabric edge node, and is configured to steer traffic from the wireless AP on the first access tunnel and having the virtual IP address to the first fabric edge node based on the active role configured for the first fabric edge node and without using the second access tunnel.

19. The one or more non-transitory computer-readable media of claim 18, wherein the virtual IP address is attached to a first tunnel endpoint (TEP) associated with the first fabric edge node and a second TEP associated with the second fabric edge node, and wherein wireless clients associated with the wireless AP are configured to use the virtual IP address to communicate with a fabric edge without using the first TEP or the second TEP.

20. The one or more non-transitory computer-readable media of claim 18, wherein the EN is configured with information indicative of a switch to a standby role for the first access tunnel provisioned for the first fabric edge node and a switch to an active role for the second access tunnel provisioned for the second fabric edge node.

* * * * *